(12) United States Patent
Abe

(10) Patent No.: US 10,442,380 B2
(45) Date of Patent: Oct. 15, 2019

(54) SIDE MEMBER DISTAL END STRUCTURE

(71) Applicant: TOYOTA JIDOSHA KABUSHIKI KAISHA, Toyota-shi (JP)

(72) Inventor: Masatoshi Abe, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/902,642

(22) Filed: Feb. 22, 2018

(65) Prior Publication Data

US 2018/0244226 A1    Aug. 30, 2018

(30) Foreign Application Priority Data

Feb. 24, 2017 (JP) ................................ 2017-033895

(51) Int. Cl.
| | | |
|---|---|---|
| *B60R 19/26* | (2006.01) | |
| *B60R 19/34* | (2006.01) | |
| *B60R 19/02* | (2006.01) | |
| *B60R 19/24* | (2006.01) | |

(52) U.S. Cl.
CPC ............ *B60R 19/34* (2013.01); *B60R 19/023* (2013.01); *B60R 19/26* (2013.01); *B60R 2019/247* (2013.01); *B60R 2019/262* (2013.01)

(58) Field of Classification Search
CPC .... B60R 19/26; B60R 19/34; B60R 2019/262
USPC ....................................................... 293/133
See application file for complete search history.

(56) References Cited

U.S. PATENT DOCUMENTS

| | | | | |
|---|---|---|---|---|
| 6,705,653 | B2 * | 3/2004 | Gotanda ................ | B60R 19/34 293/132 |
| 7,926,868 | B2 * | 4/2011 | Braunbeck ............. | F16F 7/123 293/132 |
| 8,297,668 | B2 * | 10/2012 | Nakanishi ................ | F16F 7/12 293/132 |
| 2016/0121829 | A1 * | 5/2016 | Murata ................... | B60R 19/34 293/133 |
| 2017/0106909 | A1 * | 4/2017 | Daido ..................... | B60R 19/02 |

FOREIGN PATENT DOCUMENTS

| | | | | |
|---|---|---|---|---|
| EP | 2896535 A4 * | 5/2016 | .......... | B62D 21/152 |
| JP | 2009-113675 | 5/2009 | | |
| JP | 2016-010983 A | 1/2016 | | |
| WO | WO-2011091833 A1 * | 8/2011 | ............ | B60R 19/34 |

* cited by examiner

*Primary Examiner* — Dennis H Pedder
(74) *Attorney, Agent, or Firm* — Oblon, McClelland, Maier & Neustadt, L.L.P.

(57) ABSTRACT

A side member distal end structure includes: a side member distal end part and a lid member disposed forward of a distal end of the side member distal end part. The side member distal end part includes: a closed section part whose sectional shape orthogonal to the vehicle front-rear direction has a closed section structure; and a flange part in which a first panel and a second panel are joined to each other, the flange part being disposed outer than the closed section part and extending along the vehicle front-rear direction. The lid member includes a side plate part partially joined to an outer surface which is a part of the closed section part and is disposed forward of the flange part. In the vehicle front-rear direction, a plate surface of the side plate part faces the flange part.

11 Claims, 9 Drawing Sheets

SIDE MEMBER DISTAL END STRUCTURE

INCORPORATION BY REFERENCE

The disclosure of Japanese Patent Application No. 2017-033895 filed on Feb. 24, 2017 including the specification, drawings and abstract is incorporated herein by reference in its entirety.

BACKGROUND

1. Technical Field

The disclosure relates to a side member distal end structure.

2. Description of Related Art

Japanese Patent Application Publication No. 2009-113675 (JP 2009-113675 A) discloses a crash box arranged between a front side member and a front bumper reinforcement. The crash box is formed by joining press-formed first member and second member through their flanges, respectively.

SUMMARY

In the foregoing crash box, in a case where a lid member is provided on a front side of the crash box, the lid member comes into contact with a flange part of the crash box at the time of collision, and stress is concentrated in the flange part. As a result, energy absorption by the crash box can be reduced.

The disclosure provides a side member distal end structure that is able to restrain a reduction in energy absorption caused by a lid member coming into contact with a flange part of a side member (including a crash box according to the idea of the disclosure).

An aspect of the disclosure provides a side member distal end structure. The side member distal end structure according to the aspect includes a side member distal end part and a lid member disposed forward of a distal end of the side member distal end part in a vehicle front-rear direction. The side member distal end part includes: a closed section part whose sectional shape orthogonal to the vehicle front-rear direction has a closed section structure; and a flange part in which a first panel and a second panel, the first panel and the second panel constructing at least a part of the closed section part, are joined to each other, the flange part being disposed outer than the closed section part and extending along the vehicle front-rear direction. The lid member includes a side plate part, the side plate part being partially joined to an outer surface, the outer surface being a part of the closed section part and being disposed forward of the flange part in the vehicle front-rear direction, and in the vehicle front-rear direction, a plate surface of the side plate part faces the flange part.

In the aspect, the side member distal end part includes the closed section part and the flange part. The sectional shape of the closed section part orthogonal to the axis direction has the closed section structure. Meanwhile, the flange part is a part that is formed by joining the first panel and the second panel that structure at least a part of the closed section part, is positioned on the outer side of the closed section part, and extends along the axis direction. On the other hand, the side plate part of the lid member is partially joined to an outer surface side of a part of the closed section part of the side member distal end part on the distal end side of the flange part. Thus, the lid member is provided on the distal end side of the side member distal end part. The idea of being "joined to the outer surface side" includes not only an aspect of being directly joined to the outer surface of the closed section part, but also an aspect of being indirectly joined through another member.

Further, the part of the side plate part, which faces the flange part in the axis direction, directs its plate surface towards the flange part. Therefore, at the time of collision (to be specific, when collision load in the axis directions is input from the side member distal end side), even if the side plate part of the lid member comes into contact with the flange part, not an end part but the plate surface of the side plate part is likely to come into contact with the flange part. Therefore, stress concentration that happens in the flange part is restrained in comparison with a case where the end part of the side plate part comes into contact with the flange part. Thus, according to the side member distal end structure described above, it is possible to restrain a reduction of energy absorption caused by the lid member coming into contact with the flange part of the side member.

In the aspect, the plate surface facing the flange part may include a recessed part recessed toward a front of the vehicle in the vehicle front-rear direction, the recessed part being along an erection direction of the flange part.

According to the above configuration, the recessed part recessed to the distal end side in the axis direction is formed in the plate surface of the side plate part, which faces the flange part. Further, the recessed part is formed along the erection direction of the flange part. Therefore, at the time of collision, the flange part is likely to enter the recessed part, thereby restraining misalignment of the plate surface of the side plate part with respect to the flange part. Thus, it is possible to bring the plate surface of the side plate part into contact with the flange part more accurately.

In the aspect, a facing part of the side plate part, the facing part facing the flange part in the vehicle front-rear direction, may include a joining part and an upright part, the joining part being joined to the outer surface of the closed section part, the upright part being connected with the joining part through a bent part, and the upright part extending along an erection direction of the flange part.

According to the above configuration, the upright part extending in the erection direction of the flange part comes into surface contact with the flange part highly accurately, and stress concentration that happens in the flange part is restrained even further. In addition, the upright part is provided so as to be connected with the joining part, which is joined to the outer side of the closed section part, through the bent part. Therefore, it is possible to manufacture the side plate part more easily by bending at the bent part.

In the aspect, a dimension of the upright part may be larger than a dimension of the bent part in a flange width direction, the flange width direction being perpendicular to both of the vehicle front-rear direction and the erection direction of the flange part.

According to the above configuration, the dimension of the upright part is larger than that of the bent part in the flange width direction that is perpendicular to both the axis direction and the erection direction of the flange part. Therefore, bending at the bent part is easily done, making it easy to manufacture the upright part. At the same time, as the width dimension of the upright part is ensured, the upright part comes into contact with the flange part appropriately. In a case where the dimensions of the bent part and the upright part change depending on locations, the "dimensions in the flange width direction" mean average dimensions.

In the aspect, In the aspect, the lid member may be provided so as to face the closed section part in the vehicle front-rear direction and to close an opening on a distal end of the closed section part in the vehicle front-rear direction, and the lid member may include a fastening part fastening a bumper reinforcement and the lid member to each other, the bumper reinforcement being provided along a vehicle width direction.

According to the above configuration, the lid member has the fastening part, and the fastening part fastens the lid member and the bumper RF to each other. Because of this, collision load input in the bumper RF is transferred to the lid member. Then, since the lid member is provided so as to face the closed section part in the axis direction and close the opening on the distal end side of the closed section part, the closed section part collapses in the axis direction appropriately.

In the aspect, a plate surface facing the flange part may be included in the upright part.

As explained so far, the side member distal end structure according to the disclosure has an excellent effect of restraining a reduction in energy absorption caused by the lid member coming into contact with the flange part of the side member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle front structure 10, to which a side member distal end structure S according to the disclosure is applied, is explained with reference to FIG. 1 to FIG. 6.

As shown in each of the drawings as necessary, an arrow FR shows a vehicle front side, an arrow UP shows a vehicle upper side, an arrow LH shows a left side in a vehicle width direction, and an arrow OUT shows an outer side in the vehicle width direction. Further, in the following explanation, when front and rear, upper and lower, and left and right directions are used, they mean front and rear sides in a vehicle front-rear direction, upper and lower sides in a vehicle upper-lower direction, and left and right sides in the vehicle width direction, unless otherwise specified.

<Vehicle Front Structure>

First of all, a rough structure of the vehicle front structure 10 is explained with reference to FIG. 6.

Figure 6:
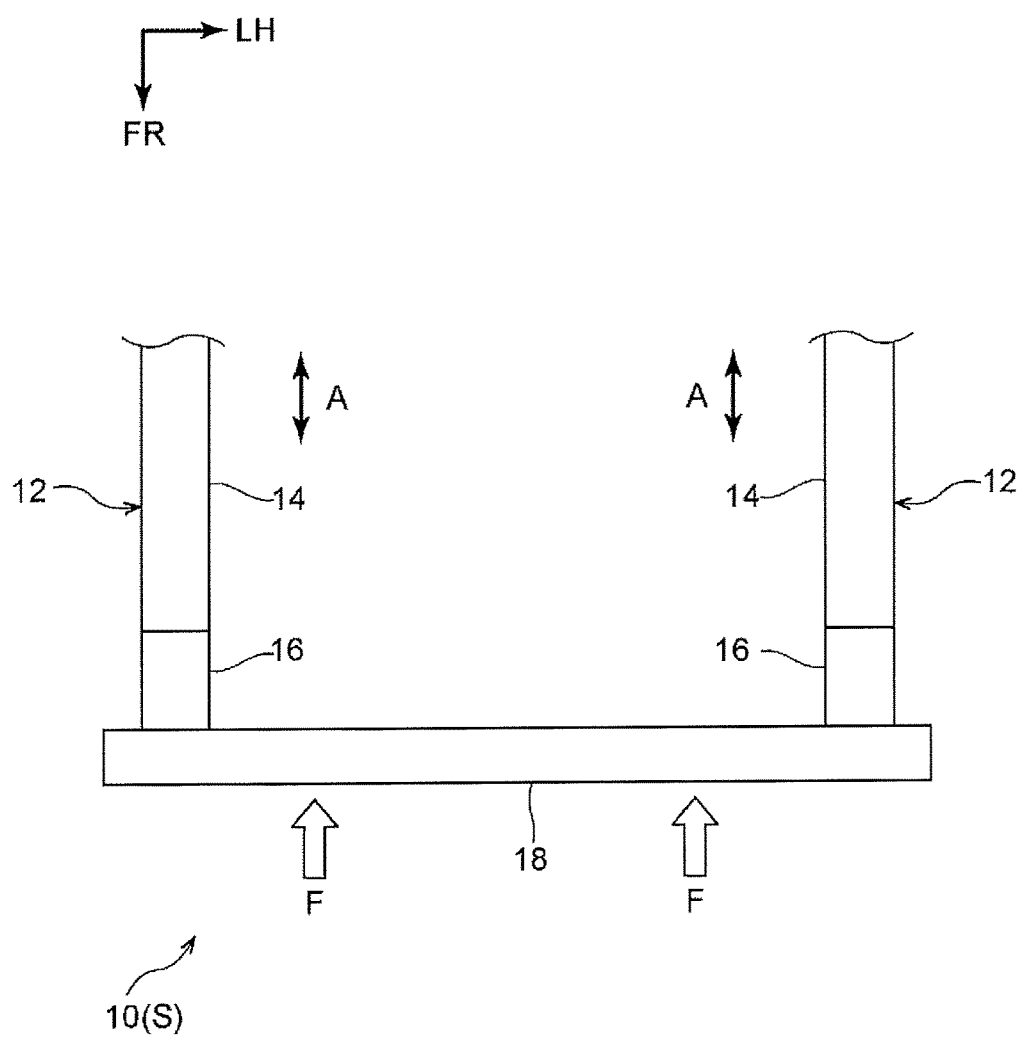
FIG. 6 is a schematic plan view of a vehicle front structure according to the embodiment.

As shown in FIG. 6, front side members 12 (hereinafter, simply referred to as "side members 12"), which form a skeleton of a vehicle body, are arranged on both left and right sides of a vehicle front part, respectively, along the vehicle front-rear direction as their longitudinal direction.

(Side Member 12)

Each of the side members 12 includes a side member body 14 and a side member distal end member 16. The side member body 14 forms an intermediate part in the front-rear direction (an intermediate part in an axis direction) from a rear part (a base end part in the axis direction) of the side member 12. The side member distal end member 16 forms a front end part (a distal end part in the axis direction) of the side member 12. A front end of the side member body 14 and a rear end of the side member distal end member 16 are joined to each other by welding or the like, and the side member body 14 and the side member distal end member 16 structure the side member 12 in which the vehicle front-rear direction serves as the axis direction A. Strength against a load in the vehicle front-rear direction (the axis direction) is set to be smaller for the side member distal end member 16 than that of the side member body 14. In this embodiment, the side member distal end member 16 corresponds to a "side member distal end part" of the disclosure.

(Bumper RF 18)

A bumper reinforcement 18 (hereinafter, abbreviated as bumper RF 18), which serves as a skeleton member whose longitudinal direction is the vehicle width direction, is arranged so as to connect front ends of the left and right side members 12 (or front ends of the left and right side member distal end members 16) in the vehicle width direction. The front ends of the side members 12 are joined to a rear side of the bumper RF 18 through later-described lid members 40 (see FIG. 3, FIG. 4), respectively, and, at the time of front collision, a collision load F input to the bumper RF 18 from a vehicle front side towards a vehicle rear side is transferred to the side members 12.

<Detailed Structures of the Side Member Distal End Member 16 and the Lid Member 40>

Next, detailed structures of the side member distal end member 16 and the lid member 40 are explained with reference to FIG. 1 to FIG. 5.

<Side Member Distal End Member 16>

Figure 2:
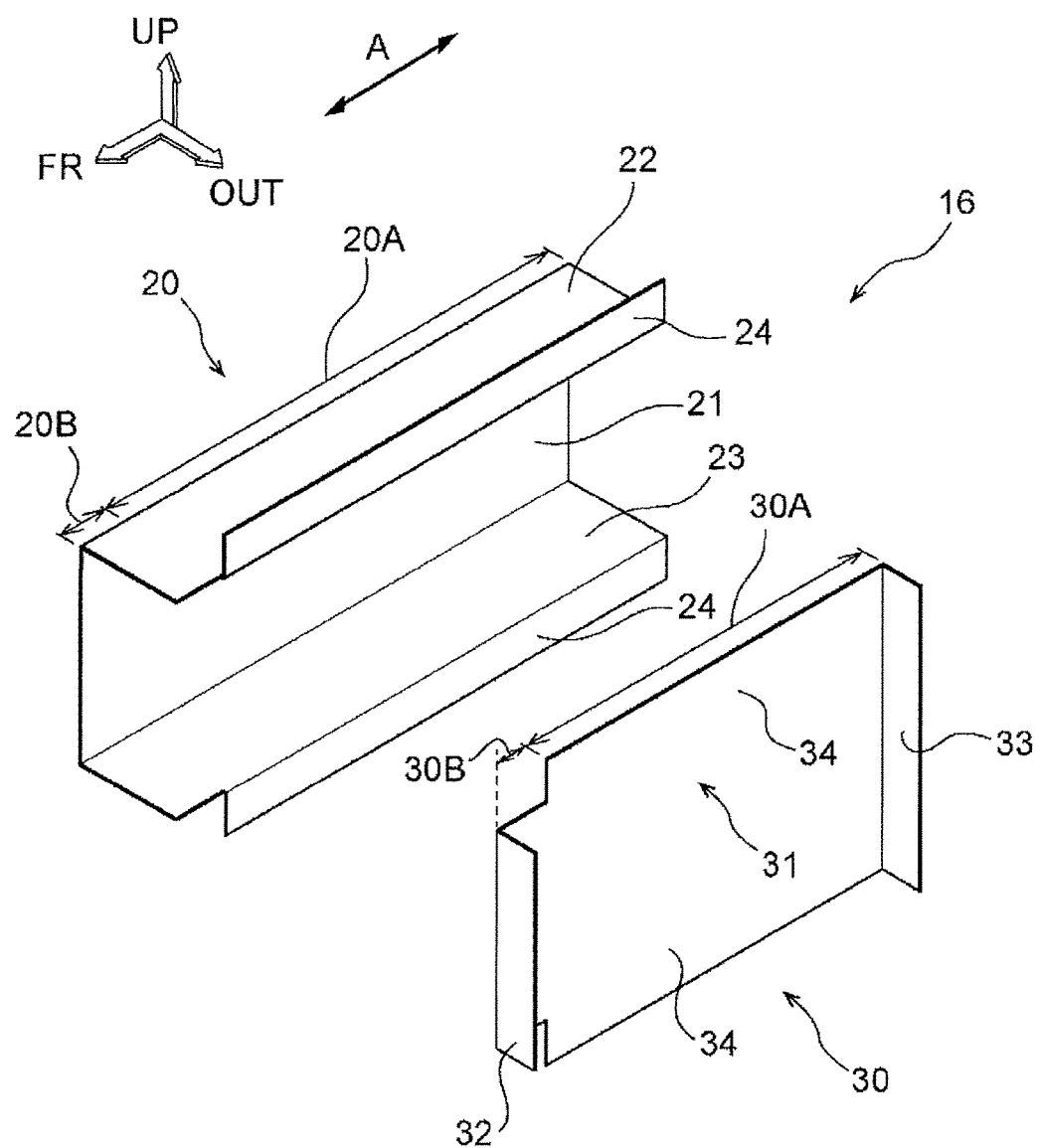
FIG. 2 is an exploded perspective view of an inner panel and an outer panel that structure the side member distal end member.
Figure 3:
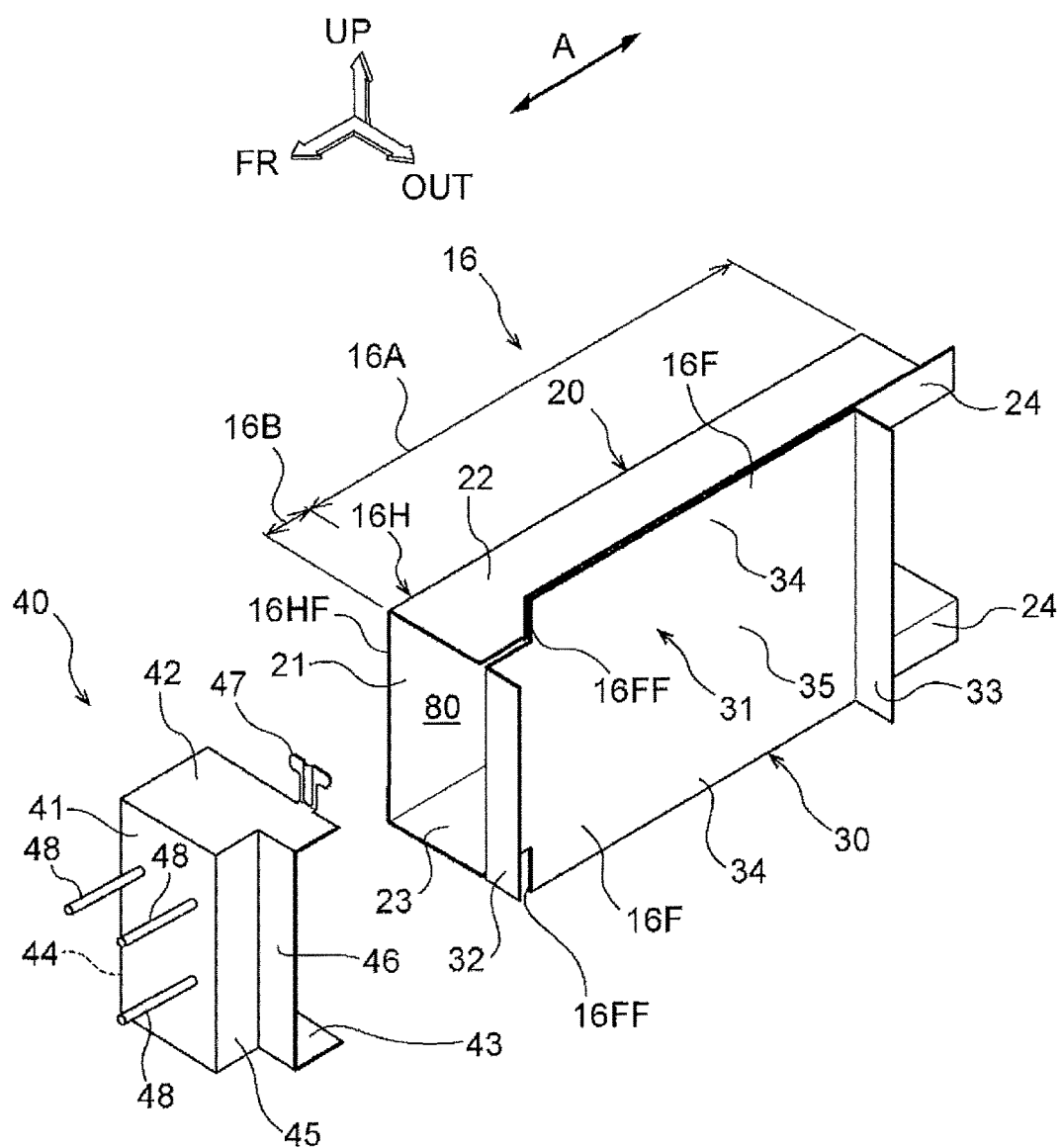
FIG. 3 is an exploded perspective view of the side member distal end member and a lid member.

As shown in FIG. 2 and FIG. 3, the side member distal end member 16 is formed by joining an inner panel 20 serving as a "first panel", and an outer panel 30 serving as a "second panel".

The inner panel 20 has a generally hat-shaped section. To be in more detail, the inner panel 20 includes a general part 20A having the hat-shaped section, and a distal end part 20B having a C-shaped (groove shape) section. In other words, an area of the inner panel 20 near a front end serves as the distal end part 20B having the C-shaped section that is open on the outer side in the vehicle width direction, and an area of the inner panel 20 on the rear side of the distal end part 20B serves as the general part 20A having the hat-shaped section.

Further, the inner panel 20 includes an inner wall part 21, which forms a top plate of the hat shape and C-shape, an upper wall part 22 that extends to the outer side in the vehicle width direction from an upper end of the inner wall part 21, a lower wall part 23 that extends to the outer side in the vehicle width direction from a lower end of the inner wall part 21, and a pair of joining parts 24 that extends to the upper and lower sides from end parts of the upper wall part 22 and the lower wall part 23 on the outer sides in the vehicle width direction, respectively. The pair of joining parts 24 is formed in the general part 20A of the inner panel 20, and is not formed in the distal end part 20B of the inner panel 20.

A dimension of the inner wall part 21 in the upper-lower direction and width dimensions (dimensions in the vehicle width direction) of the upper wall part 22 and the lower wall part 23 may be changed depending on positions in an axis direction A of the side member (hereinafter, simply referred to as an "axis direction A"). For example, the dimension of the inner wall part 21 in the upper-lower direction and the width dimensions of the upper wall part 22 and the lower wall part 23 may become smaller gradually towards the distal end side in the axis direction (the vehicle front side).

The outer panel 30 has a generally flat plate shape. To be in more detail, the outer panel 30 includes a general part 30A, whose position in the axis direction A corresponds to the general part 20A of the inner panel 20, and a distal end part 30B, whose position in the axis direction A corresponds to the distal end part 20B of the inner panel 20. In other words, an area of the outer panel 30 near a front end serves as the distal end part 30B, whose dimension in the upper-lower direction coincides with an upper-lower interval between end parts of the upper wall part 22 and the lower wall part 23 of the inner panel 20 on the outer side in the vehicle width direction. In the outer panel 30, an area on the rear side of the distal end part 30B serves as the general part 30A, whose dimension in the upper-lower direction coincides with an upper-lower interval between an upper end and a lower end of the pair of joining parts 24 of the inner panel 20.

Also, the outer panel 30 includes a flat plate part 31 having a flat plate shape, whose plate thickness direction is in the vehicle width direction, a front flange part 32 that extends from a front end of the flat plate part 31 towards the outer side in the vehicle width direction, and a rear flange part 33 that extends from a rear end of the flat plate part 31 towards the outer side in the vehicle width direction. A part of the flat plate part 31, which corresponds to the general part 20A of the inner panel 20, is formed to have a larger dimension in the upper-lower direction, and a part of the flat plate part 31, which corresponds to the distal end part 20B, is formed to have a smaller dimension in the upper-lower direction. Further, in a part of the flat plate part 31 of the outer panel 30, which corresponds to the general part 20A, an upper portion and a lower portion (portions enlarged in the upper-lower direction with respect to the distal end part 20B) serve as a pair of upper and lower joining parts 34 that are joined to the joining parts 24 of the inner panel 20, respectively.

As shown in FIG. 3, as the pair of upper and lower joining parts 24 of the inner panel 20, and the pair of upper and lower joining parts 34 of the flat plate part 31 of the outer panel 30 are joined to one another, respectively, the side member distal end member 16 is formed. The side member distal end member 16 includes a closed section part 16H and flange parts 16F. In the closed section part 16H, a sectional shape orthogonal to the axis direction A is a closed sectional shape. The flange parts 16F are formed by joining the inner panel 20 and the outer panel 30 to each other. There is an opening 80 in a front end of the closed section part 16H, and, in the opening 80, internal space of the closed section part 16H opens towards the vehicle front side.

(Closed Section Part 16H)

The closed section part 16H is formed into a rectangular closed section structure by the inner wall part 21, the upper wall part 22, and the lower wall part 23 of the inner panel 20, and a part of the flat plate part 31 of the outer panel 30 excluding the pair of upper and lower joining parts 34 (hereinafter, referred to as an outer wall part 35). To be specific, among peripheral walls that make the rectangular closed section part 16H, a wall on the inner side in the vehicle width direction is formed by the inner wall part 21 of the inner panel 20, a wall on the upper side is formed by the upper wall part 22 of the inner panel 20, a wall on the lower side is formed by the lower wall part 23 of the inner panel 20, and a wall on the outer side in the vehicle width direction is formed by the outer wall part 35 of the outer panel 30.

(Flange Part 16F)

The flange parts 16F are formed on the upper and lower sides, respectively. The upper flange part 16F is a part where the upper joining part 24 of the inner panel 20 and the upper joining part 34 of the outer panel 30 are joined by spot welding, and the lower flange part 16F is a part where the lower joining part 24 of the inner panel 20 and the lower joining part 34 of the outer panel 30 are joined by spot welding. The upper flange part 16F is erected upwardly from a boundary between the upper wall part 22 and the outer wall part 35 of the closed section part 16H, and the lower flange part 16F is erected downwardly from a boundary between the lower wall part 23 and the outer wall part 35 in the closed section part 16H (this means that, in this embodiment, the vehicle upper-lower direction is an "erecting direction of the flange parts"). Thus, the pair of upper and lower flange parts 16F is both positioned on the outer sides of the closed section part 16H, and extends along the vehicle front-rear direction, that is the axis direction A of the side member 12.

In the side member distal end member 16, a part corresponding to the general parts 20A, 30A of the inner panel 20 and the outer panel 30 is regarded as a general part 16A, and a part corresponding to the distal end parts 20B, 30B of the inner panel 20 and the outer panel 30 is regarded as a distal end part 16B. The flange parts 16F are not formed in the distal end part 16B of the side member distal end member 16, and are formed only in the general part 16A. On the other hand, the closed section part 16H is formed not only in the general part 16A of the side member distal end member 16 but also in the distal end part 16B. Because of this, a front end 16FF of the flange part 16F is positioned on the rear side of a front end 16HF of the closed section part 16H. Therefore, in the closed section part 16H of the side member distal end member 16, a part corresponding to the distal end part 16B is positioned on the front side (a distal end side in the axis direction) of the flange parts 16F.

Further, in the front end 16HF of the closed section part 16H, the front flange part 32 of the outer panel 30 is positioned, extending to the outer side in the vehicle width direction, which is an outer side of the section of the closed section part 16H.

<Lid Member 40>

Figure 1:
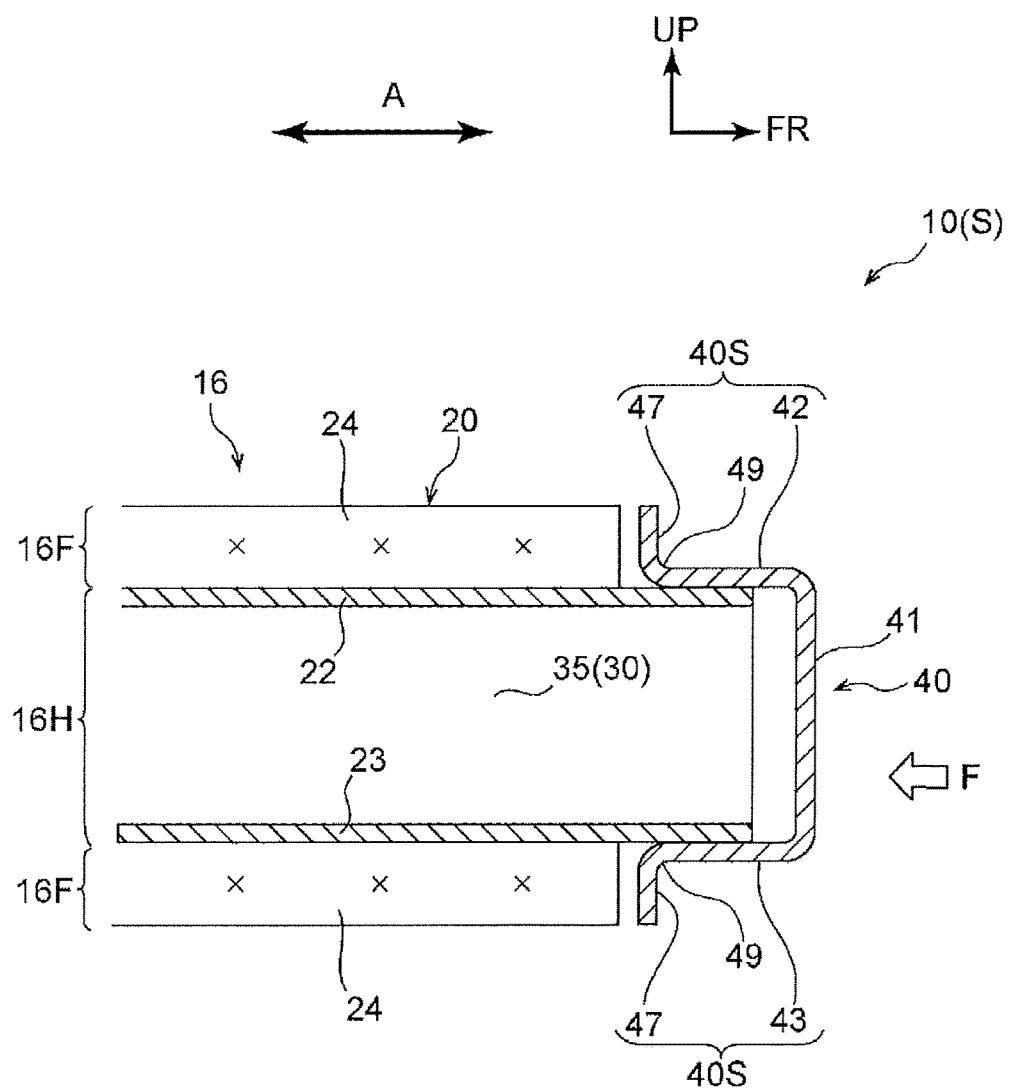
FIG. 1 is a longitudinal sectional view of a side member distal end structure according to an embodiment, the view being taken along an axis direction of the side member (a sectional view taken along the line 1-1 in FIG. 4)
Figure 4:
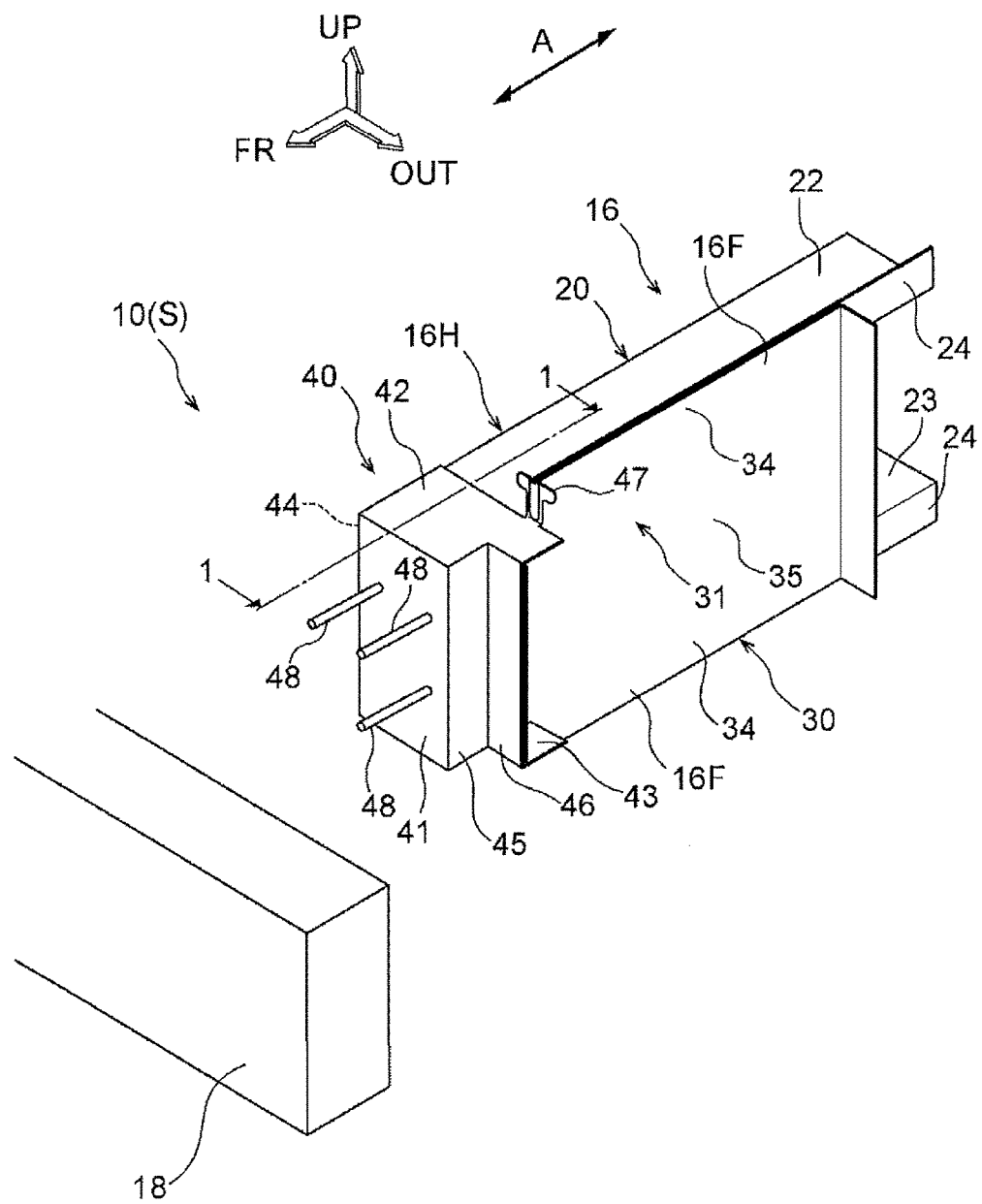
FIG. 4 is a perspective view of a state where the lid member is joined to the side member distal end member (a view of a state before a bumper RF is combined)

As shown in FIG. 3 and FIG. 4, the lid member 40 includes a top plate part 41, an upper plate part 42, a lower plate part 43, an inner plate part 44, an outer plate part 45, a front-rear joining part 46, and a pair of upper and lower bent flange parts 47 (see FIG. 1 for the lower bent flange part 47).

The top plate part 41 has a rectangular shape that is generally similar to the sectional shape of the closed section part 16H. A plurality of (three in this embodiment) stud bolts 48, which serve as "fastening parts" to be fastened to the bumper RF 18, project to the front side from a front side surface of the top plate part 41.

The upper plate part 42, the lower plate part 43, the inner plate part 44, and the outer plate part 45 extend to the vehicle rear side from an upper end, a lower end, an inner end, and an outer end of the top plate part 41, respectively, and form a sectional shape orthogonal to the axis direction A as a closed section structure.

The front-rear joining part 46 extends from a rear end of the outer plate part 45 to the outer side in the vehicle width direction, which is the outer side of the section of the closed section part 16H. A rear part of the upper plate part 42 is expanded to the outer side in the vehicle width direction, and a front end of this expanded part is connected with an upper end of the front-rear joining part 46. A rear part of the lower plate part 43 is expanded to the outer side in the vehicle width direction, and a front end of this expanded part is connected with a lower end of the front-rear joining part 46.

Then, the rear part of the upper plate part 42 is superimposed on the upper wall part 22 of the closed section part 16H from above and joined by welding. The rear part of the lower plate part 43 is superimposed on the lower wall part 23 of the closed section part 16H from below and joined by welding. A rear part of the inner plate part 44 is superimposed on the inner wall part 21 of the closed section part 16H from the inner side in the vehicle width direction and joined by welding. Thus, the upper plate part 42, the lower plate part 43, and the inner plate part 44, as well as the upper and lower bent flange parts 47 connected with the rear parts of the upper plate part 42 and the lower plate part 43, respectively, are arranged on outer surface sides of a portion of the closed section part 16H on the front side (the distal end side) of the flange part 16F (a portion corresponding to the distal end part 16B of the closed section part 16H, see FIG. 3). Thus, the upper plate part 42, the lower plate part 43, the inner plate part 44, and the bent flange parts 47 in this embodiment are equivalent to a "side plate part" according to the disclosure, and the upper plate part 42, the lower plate part 43, and the inner plate part 44, which are a part of the "side plate part" are joined to an outer surface of the closed section part 16H.

Meanwhile, the outer plate part 45 is formed so that its dimension in the front-rear direction is smaller than those of the upper plate part 42, the lower plate part 43, and the inner plate part 44. Because of this, in the outer plate part 45, there is not a part that corresponds to the rear parts of the upper plate part 42, the lower plate part 43, and the inner plate part 44, and the outer plate part 45 is not joined to the closed section part 16H. Instead, the front-rear joining part 46 connected with the rear end of the outer plate part 45 is joined to the front flange part 32 of the side member distal end member 16 (the front flange part 32 of the outer panel 30).

By being joined as described above, the lid member 40 is provided on the front side of the side member distal end member 16 so as to close the opening 80 on the front side of the closed section part 16H of the side member distal end member 16. Further, the lid member 40 faces the entire peripheral walls (the whole circumference) of the closed section part 16H in the axis direction A.

(Bent Flange Part 47)

The upper bent flange part 47 is formed in a part of the lid member 40, which faces the upper flange part 16F in the front-rear direction, and the lower bent flange part 47 is formed in a part of the lid member 40, which faces the lower flange part 16F in the front-rear direction (see FIG. 1). Since the lower bent flange part 47 has generally the same structure (horizontal symmetrical structure) as that of the upper bent flange part 47, only the structure of the upper bent flange part 47 is explained below.

Figure 5:
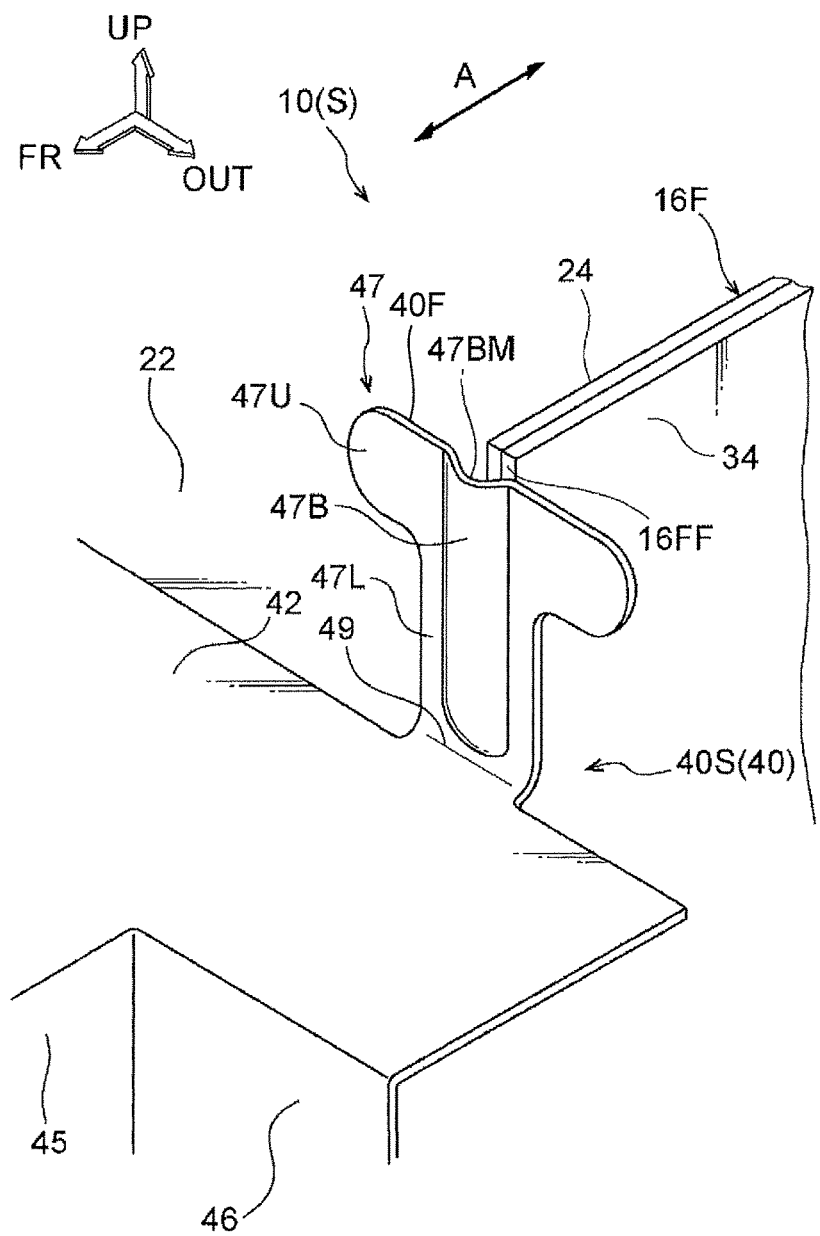
FIG. 5 is an enlarged perspective view of an upper bent flange part shown in FIG. 4.

FIG. 5 shows the enlarged upper bent flange part 47. As shown in FIG. 5, the upper bent flange part 47 is formed by bending a part between the upper plate part 42 and the upper bent flange part 47 in a plate thickness direction. Thus, a bent part 49 is formed between the upper plate part 42 and the bent flange part 47. Specifically, the plate thickness direction of the upper plate part 42 is directed in the upper-lower direction, and the upper plate part 42 is bent at the bent part 49 at about 90 degrees in the plate thickness direction and connected with the bent flange part 47. Because of this, the upper bent flange part 47 extends along the vehicle upper direction, which is the erection direction of the flange part 16F of the side member distal end member 16.

The upper bent flange part 47 is made of a wide part 47U formed in an upper portion of the upper bent flange part 47, and a narrow part 47L formed in a lower portion of the upper bent flange part 47. The wide part 47U is formed so that its width dimension (a dimension perpendicular to both the axis direction A and the vehicle upper direction serving as the erection direction of the flange part 16F, or a dimension in the vehicle width direction in this embodiment) is larger than that of the narrow part 47L. A lower side of the narrow part 47L is connected with the bent part 49, and the width dimension of the bent part 49 is equal to that of the narrow part 47L.

Further, a bead 47B, which extends in the upper-lower direction, is formed in the bent flange part 47. Thus, a recessed part 47BM, which is recessed towards the front side, is formed in a plate surface 40F of the upper bent flange part 47 on the vehicle rear side (an inner plate surface 40F) along the vehicle upper direction, which is the erection direction of the flange part 16F. The position where the recessed part 47BM is formed is a position where the front end 16FF of the flange part 16F comes into contact with the bent flange part 47 when the bent flange part 47 moves towards vehicle rear side as it is. The recessed part 47BM is formed not only in the wide part 47U but also in the narrow part 47L of the upper bent flange part 47.

Next, action effects of the side member distal end structure S according to this embodiment are explained.

As shown in FIG. 1, in the side member distal end structure S according to this embodiment, the side member distal end member 16 includes the closed section part 16H and the flange parts 16F. A sectional shape of the closed section part 16H orthogonal to the axis direction is a closed section structure. On the other hand, each of the flange parts 16F is a part where the inner panel 20 and the outer panel 30, which structure the closed section part 16H, are joined to each other, arranged on the outer side of the closed section part 16H, and extends along the vehicle front-rear direction that is the axis direction A. Meanwhile, a side plate part 40S of the lid member 40 is joined to an outer surface of a portion of the closed section part 16H of the side member distal end member 16 on the distal end side of the flange parts 16F (a portion corresponding to the distal end part 16B in the closed section part 16H of the side member distal end member 16, see FIG. 3). Thus, the lid member 40 is provided in the distal end side (the vehicle front side) of the side member distal end member 16.

Further, the bent flange parts 47 are formed in parts of the side plate part 40S, which face the flange parts 16F in the axis direction A, respectively, and inner plate surfaces 40F of the bent flange parts 47 are faced towards the flange parts 16F, respectively. Thus, at the time of collision (to be specific, when a collision load F is input from the vehicle front side, which is the distal end side of the side member, at the time of front collision), even if the side plate part 40S of the lid member 40 comes into contact with the flange parts 16F of the side member distal end member 16, not an end part but a plate surface 40F of the side plate part 40S is likely to come into contact with the flange parts 16F. Therefore, stress concentration that happens in the flange parts 16F is restrained. Thus, it is possible to restrain a reduction of energy absorption caused by the lid member 40 coming into contact with the flange parts 16F of the side member distal end member 16.

Figure 7A:
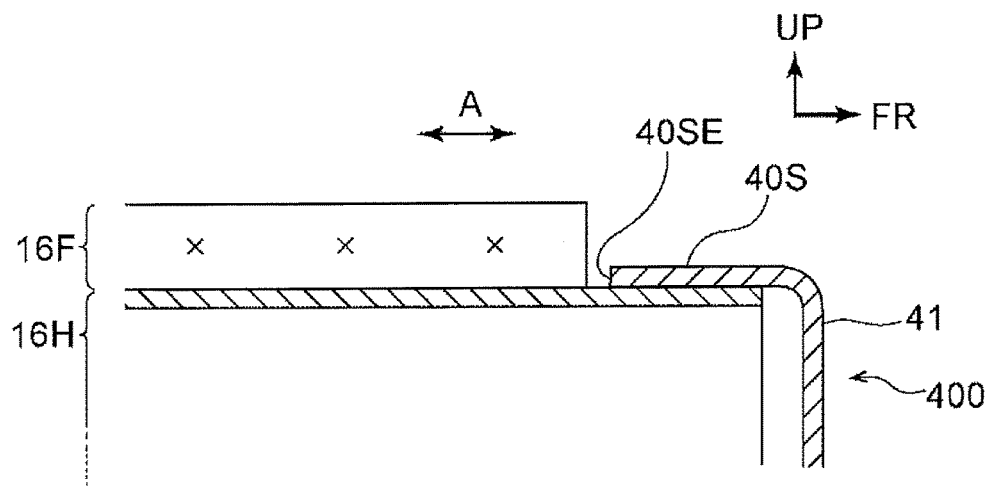
FIG. 7A is a longitudinal sectional view of a side member distal end structure according to a comparative form along an axis direction of a side member, showing a state before collision.
Figure 7B:
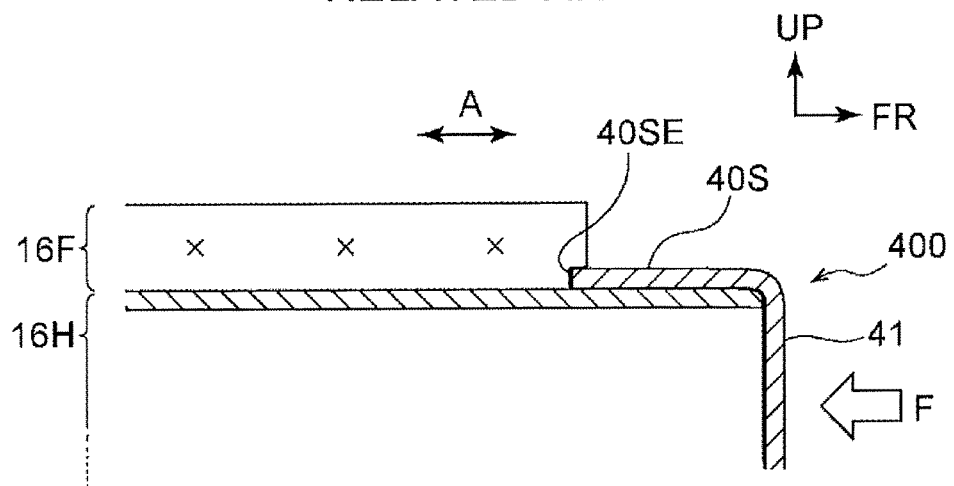
FIG. 7B is a longitudinal sectional view of the side member distal end structure according to the comparative form along the axis direction of the side member, showing a state after collision.

Here, as additional explanation to give better understanding of action effects of this embodiment, explanation is given regarding action effects of a side member distal end structure according to a comparative form shown in FIG. 7A and FIG. 7B. The side member distal end structure according to the comparative form includes a lid member 400 instead of the lid member 40 of the embodiment. As shown in FIG. 7A, in the lid member 400, the bent flange part 47 is not formed in a part of a side plate part 40S, which faces a flange part 16F in the axis direction A. In the comparative form, in a case where a load F is input in the lid member 400 from the vehicle front side and the lid member 400 comes into contact with the flange part 16F, an end part 40SE of the side plate part 40S of the lid member 400 comes into contact with a root portion of the flange part 16F as shown in FIG. 7B. Therefore, for example, the end part 40SE of the side plate part 40S of the lid member 400 bites into the root portion of the flange part 16F, and the flange part 16F can fracture, starting from the root portion. When the flange part 16F fractures from the root portion, an inner panel 20 and an outer panel 30 are separated from each other, with an effect of the fact that points of spot welding are located closer to the center of the flange part 16F than the root portion. Also, even if the side plate part 40S does not bite into the root portion of the flange part 16F, stress concentration is likely to happen in the flange part 16F as the end part 40SE of the side plate part 40S comes into contact with the flange part 16F. Hence, it is hard to realize an axial collapse mode, in which a closed section part 16H of the side member distal end member 16 collapses sequentially in the axis direction while maintaining its sectional structure.

Further, in the side member distal end structure S according to this embodiment, as shown in FIG. 5, the recessed part 47BM recessed to the distal end side in the axis direction is formed in a plate surface 40F facing the flange part 16F of the side plate part 40S (meaning a surface of the bent flange part 47 on the vehicle rear side). Further, the recessed part 47BM is formed along the vehicle upper-lower direction, which is the erection direction of the flange part 16F. Therefore, at the time of collision, the flange part 16F easily enters the recessed part 47BM, thus restraining misalignment of the side plate part 40S (misalignment in the vehicle width direction) with respect to the flange part 16F. Therefore, it is possible to bring the plate surface 40F of the side plate part into contact with the flange part 16F more accurately.

Moreover, in the side member distal end structure S according to this embodiment, the bent flange part 47 extends along the vehicle upper-lower direction, which is the erection direction of the flange part 16F. This means that a part of the side plate part 40S, which faces the flange part 16F in the axis direction A, includes an upright part (in this embodiment, the entire bent flange part 47 is the "upright part") extending in the erection direction of the flange part 16F. Therefore, the upright part comes into surface contact with the flange part highly accurately, and stress concentration that happens in the flange part 16F is restrained even further. In addition, the upright part (the bent flange part 47) is provided so as to be connected with the upper plate part 42 through the bent part 49, the upper plate part 42 being the "joining part" joined to the outer side of the closed section part 16H. Therefore, manufacture is easily done by bending the side plate part 40S at the bent part 49.

Further, as shown in FIG. 5, in side member distal end structure S according to the embodiment, the bent flange part 47 is made of the wide part 47U and the narrow part 47L, and the bent part 49 is formed to have a width dimension equal to that of the narrow part 47L. This means that, in the bent flange part 47 serving as the upright part, an average dimension in a flange width direction (the vehicle width direction in this embodiment), which is perpendicular to both the axis direction A and the erection direction of the flange part 16F, is larger than that of the bent part 49. Therefore, bending at the bent part 49 is easily done, making manufacture easy. At the same time, as the width dimension of the bent flange part 47 (especially the wide part 47U), which is the upright part, is ensured, the upright part comes into contact with the flange part 16F appropriately.

Further, in side member distal end structure S according to this embodiment, the lid member 40 has the stud bolts 48 in the top plate part 41, and the stud bolts 48 fasten the lid member 40 and the bumper RF 18 to each other. Because of this, a collision load input to the bumper RF 18 is transferred to the top plate part 41 of the lid member 40. Since the lid member 40 is provided so as to face the closed section part 16H in the vehicle front-rear direction in the axis direction, and close the opening 80 in the distal end side of the closed section part 16H, the closed section part 16H is collapsed appropriately in the axis direction A.

Supplementary Explanation of the Foregoing Embodiment

In the foregoing embodiment, the example is explained, in which the disclosure is applied to the vehicle front structure 10. However, the disclosure is not limited to this, and may be applied to a rear structure of a vehicle body. In this case, a rear side member extending in the vehicle front-rear direction in the rear part of the vehicle body corresponds to the "side member", and the vehicle rear side becomes the distal end side of the side member in the axis direction.

Further, in the foregoing embodiment, the example is explained, in which the distal end part of the side member 12 is made of the side member distal end member 16, which is a separate body from the intermediate part of the side member 12 in the axis direction. However, the disclosure is not limited to this. The disclosure may be applied to a structure of a distal end part of a side member, in which the distal end part and the rest of the part are formed integrally.

Figure 8A:
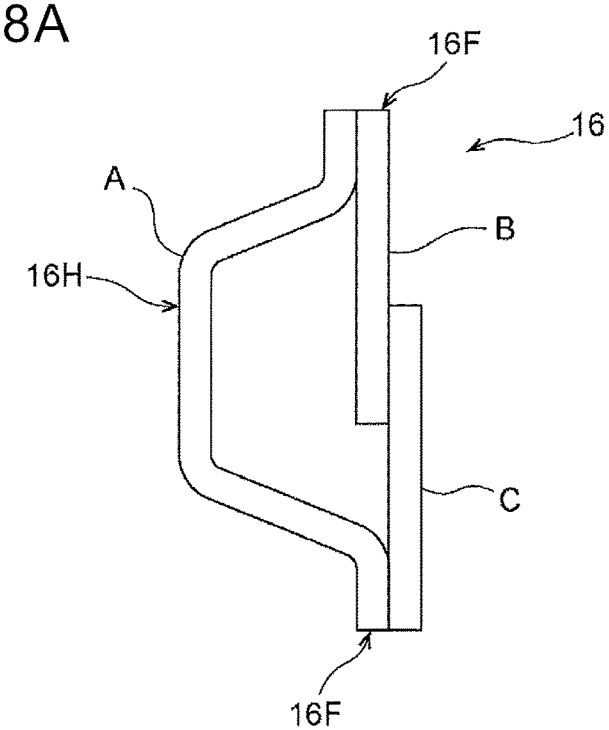
FIG. 8A is a view of a modification of the side member distal end member, showing an example where the outer panel according to the embodiment is made of two panels.
Figure 8B:
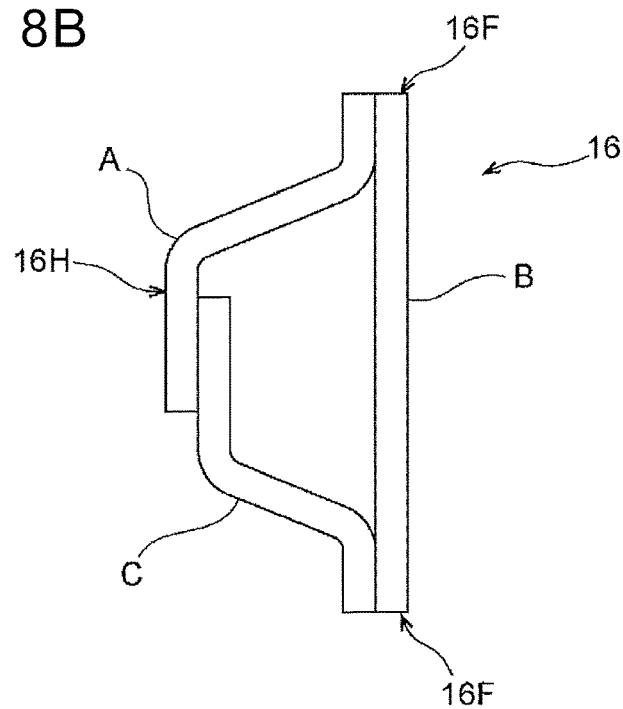
FIG. 8B is a view of a modification of the side member distal end member, showing an example where the inner panel according to the embodiment is made of two panels.

Furthermore, in the foregoing embodiment, the example is explained, in which the closed section part 16H is structured from two panels, which are the inner panel 20 and the outer panel 30. However, the disclosure is not limited to this. For example, as shown in FIG. 8A and FIG. 8B, a side member distal end member 16 may be formed by joining three panels, and a closed section part 16H may be made of three panels. Just in case, out of the two examples, the one in FIG. 8A is explained. In an upper flange part 16F, a panel A and a panel B, which structure a part of the closed section part 16H, are joined to one another, and, in a lower flange part 16F, the panel A and a panel C, which structure a part of the closed section part 16H, are joined to one another.

Also, in the foregoing embodiment, the example is explained in which the sectional shape of the closed section part 16H, which is orthogonal to the axis direction A of the side member 12, is rectangular. However, the disclosure is not limited to this. The sectional shape of the closed section part may be a circular shape, an elliptic shape, a polygonal shape, or other different closed sectional shapes.

Moreover, in the foregoing embodiment, the example is explained in which the bent flange parts 47 serving as the "upright parts" extending in the erection direction of the flange part 16F are formed, and the upright parts (the bent flange parts 47) are provided so as to be connected with the upper plate part 42 and the lower plate part 43 through the bent parts 49, respectively. The upper plate part 42 and the lower plate part 43 serve as the "joining parts" joined to the outer side of the closed section part 16H. However, the disclosure is not limited to this.

Figure 9A:
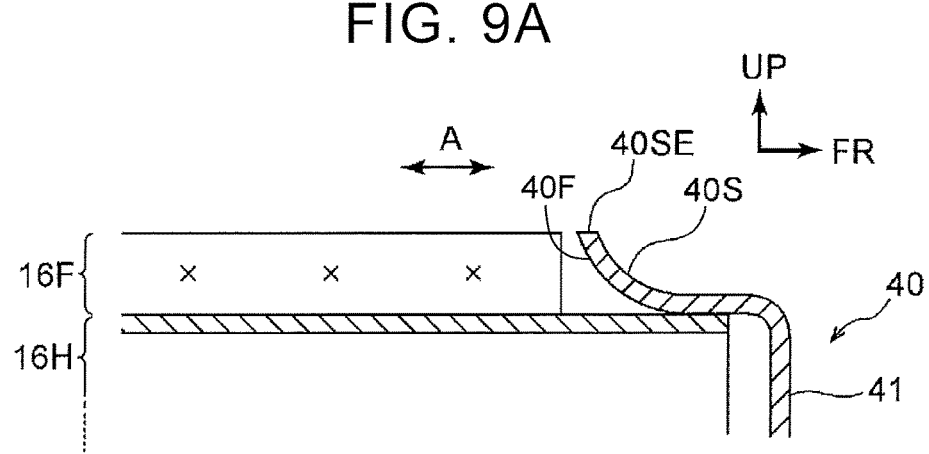
FIG. 9A is a view of a modification of the side member distal end structure, specifically showing variation of a shape of a side plate part of the lid member.

For example, as shown in FIG. 9A, the upright part may not be provided. Instead, a part of a side plate part 40S, which faces a flange part 16F in the axis direction, may be formed into a bent part as a whole. To be specific, in the side plate part 40S, a portion from a part that is in contact with an outer surface of a closed section part 16H through an end part 40SE of the side plate part 40S is the bent part. The end part 40SE of the side plate part 40S is positioned at the height of an upper end of the flange part 16F (an end part in the erection direction). In this example, a plate surface 40F on the back of the side plate part 40S is faced towards the flange part 16F, thereby restraining stress concentration that happens in the flange part 16F.

Figure 9B:
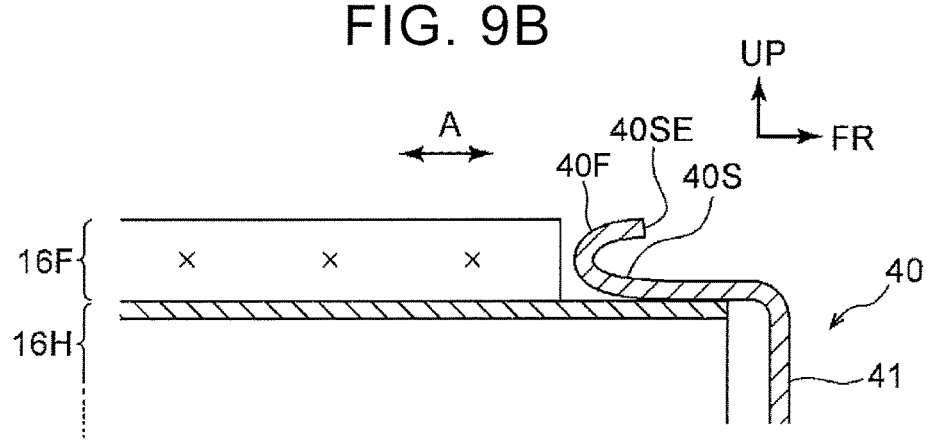
FIG. 9B is a view of a modification of the side member distal end structure, specifically showing variation of the shape of the side plate part of the lid member.

Further, for example, as shown in FIG. 9B, an end part 40SE of a side plate part 40S may be folded back towards the vehicle front side (the distal end side in the axis direction). In this example, a plate surface 40F on the back of the side plate part 40S is also faced towards a flange part, thereby restraining stress concentration that happens in the flange part 16F.

Figure 9C:
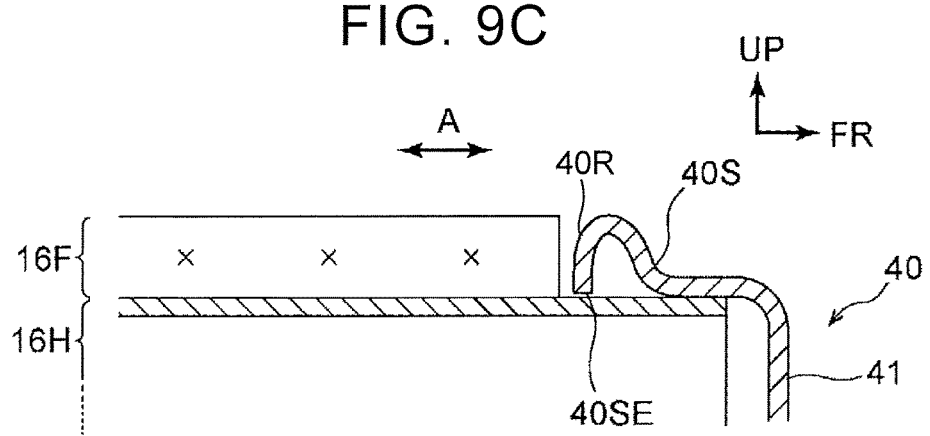
FIG. 9C is a view of a modification of the side member distal end structure, specifically showing variation of the shape of the side plate part of the lid member.

Furthermore, for example, as shown in FIG. 9C, a side plate part 40S may first be bent towards the vehicle upper side, which is an erection direction of a flange part 16F, and then bent to the vehicle lower side, which is opposite to the erection direction of the flange part 16F. In this example, a plate surface 40R on the surface side of the side plate part 40S is faced towards the flange part 16F. Although the plate surface facing the flange part 16F (40R) is on the opposite side to those of the previous examples (40F), in this example, an end part 40SE of the side plate part 40S is restrained from coming into contact with the flange part 16F, and the plate surface is likely to be in contact with the flange part 16F. Therefore, stress concentration that happens in the flange part 16F is restrained.

Also, although not specifically mentioned in the explanation of the foregoing embodiment, the lid member 40 may be made of two components. For example, a member including the top plate part 41 of the lid member 40, and a member including the side plate part 40S may be formed separately from each other, and the lid member may be formed by joining both members.

A "side member distal end part" in the disclosure is not limited to the specific structure of the side member distal end member 16 according to the foregoing embodiment. For example, in the side member distal end member 16, the general part 16A and the distal end part 16B may be formed into separate bodies from each other, and then bonded to each other integrally. Also, for example, the flange parts 16F may be formed in the left and right sides instead of the upper and lower sides. Moreover, a joining method for the flange parts 16F may be laser welding, arc welding, or other joining methods instead of spot welding. Furthermore, the flange parts 16F may be welded at their root portions.

Although the example was explained in which the recessed part 47BM is formed in the bent flange part 47, the disclosure is not limited to this. It is not necessary to form the recessed part 47BM. Also, even in the case where the recessed part 47BM is formed, it is not necessary to form the recessed part 47BM so as to correspond to the entire dimension of the flange part 16F in the upper-lower direction along the erection direction of the flange part 16F (the vehicle upper-lower direction in the foregoing embodiment). For example, the recessed part 47BM may be formed only in the wide part 47U, which is the upper portion of the bent flange part 47, and it is not necessary to form the recessed part 47BM in the narrow part 47L, which is the lower portion.

What is claimed is:

1. A side member distal end structure, comprising:
   a side member distal end part; and
   a lid member forward of a distal end of the side member distal end part in a vehicle front-rear direction, wherein
   the side member distal end part includes a closed section part whose sectional shape orthogonal to the vehicle front-rear direction has a closed section structure; and
   a flange part in which a first panel and a second panel, the first panel and the second panel constructing at least a part of the closed section part, are joined to each other, the flange part being outward from the closed section part in a vehicle width direction and extending along the vehicle front-rear direction,
   the lid member includes a side plate part, the side plate part being partially joined to an outer surface, the outer surface being a part of the closed section part and being forward of the flange part in the vehicle front-rear direction,
   in the vehicle front-rear direction, a plate surface of the side plate part faces the flange part, and
   the plate surface facing the flange part includes a recessed part recessed toward a front of the vehicle in the vehicle front-rear direction, the recessed part being along an erection direction of the flange part.

2. The side member distal end structure according to claim 1, wherein
   a facing part of the side plate part, the facing part facing the flange part in the vehicle front-rear direction, includes a joining part and an upright part, the joining part being joined to the outer surface of the closed section part, the upright part being connected with the joining part through a bent part, and the upright part extending along the erection direction of the flange part.

3. The side member distal end structure according to claim 2, wherein
a dimension of the upright part is larger than a dimension of the bent part in a flange width direction, the flange width direction being perpendicular to both of the vehicle front-rear direction and the erection direction of the flange part.

4. The side member distal end structure according to claim 1, wherein
the lid member faces the closed section part in the vehicle front-rear direction to close an opening on a distal end of the closed section part in the vehicle front-rear direction, and
the lid member includes a fastening part fastening a bumper reinforcement and the lid member to each other, the bumper reinforcement being along the vehicle width direction.

5. The side member distal end structure according to claim 2, wherein
the plate surface facing the flange part is included in the upright part.

6. A side member distal end structure, comprising:
a side member distal end part; and
a lid member forward of a distal end of the side member distal end part in a vehicle front-rear direction, wherein
the side member distal end part includes a closed section part whose sectional shape orthogonal to the vehicle front-rear direction has a closed section structure; and
a flange part in which a first panel and a second panel, the first panel and the second panel constructing at least a part of the closed section part, are joined to each other, the flange part being outward from the closed section part in a vehicle width direction and extending along the vehicle front-rear direction,
the lid member includes a top plate part, an upper plate part, a lower plate part, and an upper bent flange part upwardly extending from the top plate part, the upper plate part and the lower plate part being partially joined to an outer surface, the outer surface being a part of the closed section part and being forward of the flange part in the vehicle front-rear direction, and
in the vehicle front-rear direction, the upper bent flange part faces the flange part.

7. The side member distal end structure according to claim 6, wherein
the upper bent flange part is a first upper bent flange part and the lid member includes a second upper bent flange part, the first upper bent flange part and the second upper bent flange part being on respectively opposite outer sides of the closed section part.

8. The side member distal end structure according to claim 6, wherein
the upper bent flange part facing the flange part includes a recessed part recessed toward a front of the vehicle in the vehicle front-rear direction, the recessed part being along an erection direction of the flange part.

9. The side member distal end structure according to claim 6, wherein
the upper plate part is a joining part being joined to the outer surface of the closed section part, and
the upper bent flange part is an upright part being connected with the joining part through a bent part, and the upright part extends along an erection direction of the flange part.

10. The side member distal end structure according to claim 9, wherein
a dimension of the upright part is larger than a dimension of the bent part in a flange width direction, the flange width direction being perpendicular to both of the vehicle front-rear direction and the erection direction of the flange part.

11. The side member distal end structure according to claim 6 wherein
the lid member faces the closed section part in the vehicle front-rear direction to close an opening on a distal end of the closed section part in the vehicle front-rear direction, and
the lid member includes a fastening part fastening a bumper reinforcement and the lid member to each other, the bumper reinforcement being along the vehicle width direction.

\* \* \* \* \*